United States Patent
Kaczmarski et al.

(10) Patent No.: US 7,072,915 B2
(45) Date of Patent: Jul. 4, 2006

(54) COPY METHOD SUPPLEMENTING OUTBOARD DATA COPY WITH PREVIOUSLY INSTITUTED COPY-ON-WRITE LOGICAL SNAPSHOT TO CREATE DUPLICATE CONSISTENT WITH SOURCE DATA AS OF DESIGNATED TIME

(75) Inventors: Michael Allen Kaczmarski, Tucson, AZ (US); Donald Paul Warren, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 10/055,431

(22) Filed: Jan. 22, 2002

(65) Prior Publication Data
US 2003/0140070 A1    Jul. 24, 2003

(51) Int. Cl.
*G06F 17/30*    (2006.01)

(52) U.S. Cl. .......................... 707/204; 707/1; 711/114; 711/162

(58) Field of Classification Search ........ 707/201–204; 711/162, 114
See application file for complete search history.

(56) References Cited

U.S. PATENT DOCUMENTS

| | | | |
|---|---|---|---|
| 5,403,639 A | 4/1995 | Belsan et al. ............... 395/600 |
| 5,504,883 A | 4/1996 | Coverston et al. .......... 395/600 |
| 5,664,186 A | 9/1997 | Bennett et al. ............. 395/620 |
| 5,761,678 A | 6/1998 | Bendert et al. ............. 707/204 |
| 5,764,972 A | 6/1998 | Crouse et al. .............. 395/601 |
| 5,963,962 A | 10/1999 | Hitz et al. .................. 707/202 |
| 6,038,639 A | 3/2000 | O'Brien et al. ............. 711/114 |
| 6,047,294 A | 4/2000 | Deshayes et al. ........... 707/204 |
| 6,061,770 A | 5/2000 | Franklin .................... 711/162 |
| 6,131,148 A | 10/2000 | West et al. ................. 711/162 |
| 6,182,198 B1 | 1/2001 | Hubis et al. ................ 711/162 |
| 6,212,531 B1 * | 4/2001 | Blea et al. .................. 707/204 |
| 6,237,008 B1 | 5/2001 | Beal et al. .................. 707/204 |
| 6,721,764 B1 * | 4/2004 | Hitz et al. .................. 707/202 |
| 2002/0083037 A1 * | 6/2002 | Lewis et al. ................. 707/1 |
| 2004/0010487 A1 * | 1/2004 | Prahlad et al. ............... 707/1 |

* cited by examiner

*Primary Examiner*—Mohammad Ali
*Assistant Examiner*—Sathyanarayan Pannala
(74) *Attorney, Agent, or Firm*—John Kennel

(57) ABSTRACT

A copy method is disclosed to provide a duplicate copy of source data where the duplicate copy is consistent with the source data as of a designated time. The method includes creating a copy-on-write relationship between specified source data and an original image cache, utilizing an application outboard of the designated host application to copy all items of source data and their associated locations to a secondary data object without regard to whether the items source data have been updated since creating the copy-on-write relationship, and copying a specified amount of contents of the original image cache to the secondary data object. The specified amount includes contents of the original image cache as of completion of the utilizing operation. In addition, the method includes permitting copy-on-write relationship to continue during the utilizing operation and during at least part of the copying operation.

15 Claims, 6 Drawing Sheets

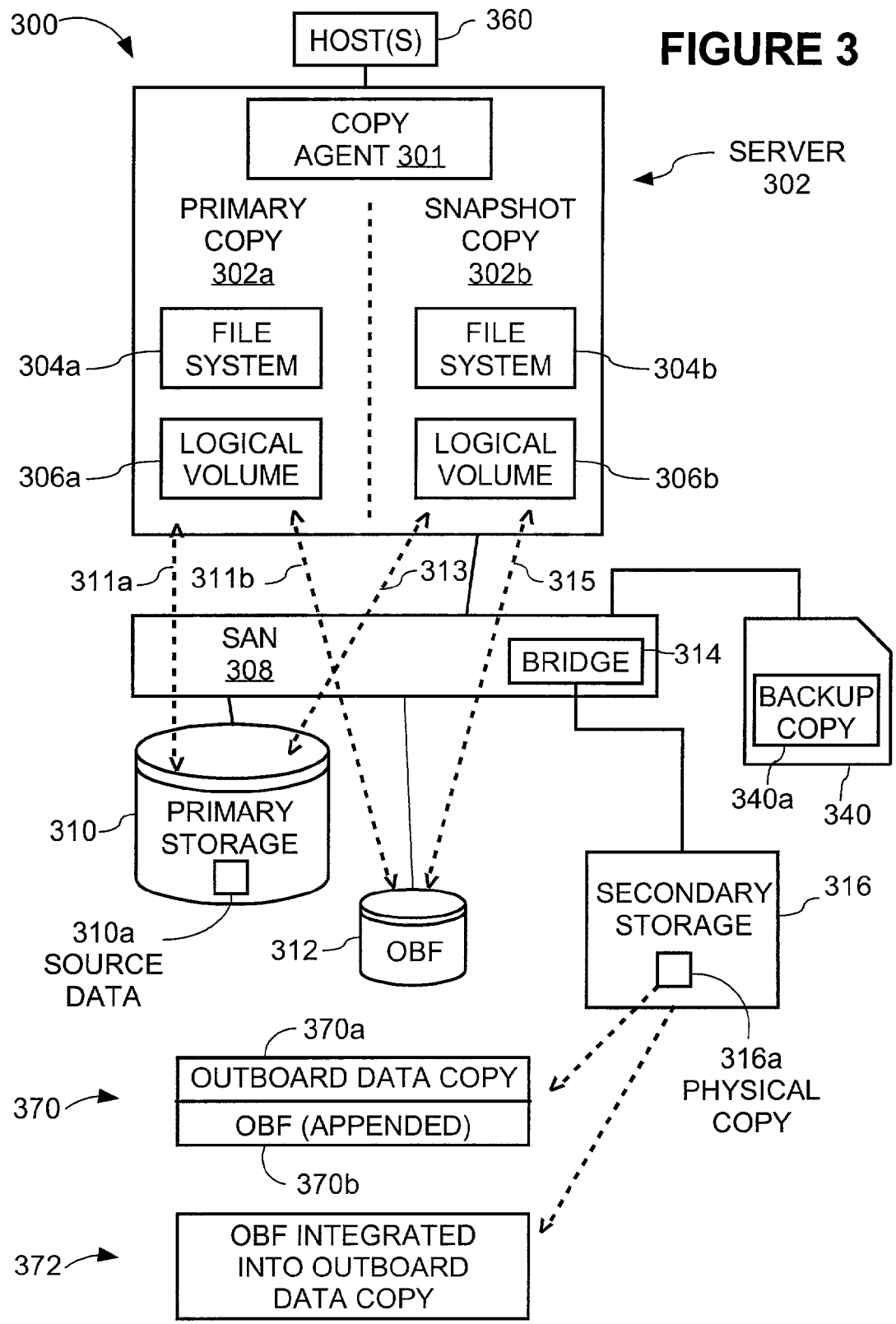

COPY METHOD SUPPLEMENTING OUTBOARD DATA COPY WITH PREVIOUSLY INSTITUTED COPY-ON-WRITE LOGICAL SNAPSHOT TO CREATE DUPLICATE CONSISTENT WITH SOURCE DATA AS OF DESIGNATED TIME

BACKGROUND OF THE INVENTION

1. Field of the Invention

The present invention relates to techniques for copying digital data. More particularly, the invention concerns a copy method supplementing an outboard data copy with a previously instituted copy-on-write logical snapshot to effectively create a duplicate of source data consistent as of a specific time.

2. Description of the Related Art

The advent of fibre channel connectivity used by storage area network (SAN) technology has enabled new paradigms for accessing and copying computer data. The most prevalent copy method uses the SCSI-3 extended copy command (XCOPY) to copy SCSI blocks from one device to another under the control of a copy agent such as a SCSI fibre channel bridge or other SCSI device. The copy agent moves the data outboard from the application host that normally accesses the data.

With outboard copy operations such as the SCSI-3 XCOPY command, data movement operations are off-loaded from the application host by utilizing another process with alternative access to host disks. Some known storage systems 100 (FIG. 1) implement XCOPY functionality using a hardware component in the SAN 102, such as a fibre-channel to SCSI bridge 104. Commands issued to the bridge 104 cause it to directly access blocks from one or more disks 106 attached to the SAN 102 and copy them to another location 108, such as another SAN-attached disk or tape. This copy operation 110 performs input/output (I/O) to host disks 106 outside the path 112 normally used by the file system 116 of the host 114.

When copying large amounts of data, such as file systems or large databases, the copy operation 110 can take some time to complete. If the data being copied is undergoing changes on the host computer 114 while being copied, the copied data will likely not be consistent with any point in time that actually existed on the host 114 because the file system I/O 112 is not coordinated with the outboard copy operation 110.

One known technique to obtain a consistent copy is to make a "physical snapshot" of the source data. In this technique, a mirrored copy (not shown) of the source data is maintained at all times. Then, at the instant when the physical snapshot is desired, the relationship between source and mirrored copy is broken. The mirrored copy thus reflects the content of the source data as of that moment in time. With this approach, an outboard data copy can be created using traditional methods, namely, by copying the (previously mirrored) physical copy. This is possible without disturbing the original data because the physical copy is now disconnected from the source data. Moreover, after creating the physical snapshot, the original file system and physical snapshot can be accessed independently. One disadvantage, however, is that well before the mirrored copy is ever needed, it occupies a significant amount of storage space, namely the same size as the source data.

Another known technique to obtain a consistent copy is the "logical snapshot," illustrated in FIG. 2A. Unlike a physical snapshot, the logical snapshot works by instantly declaring a body of secondary data 202 to be a duplicate of the source data 204. This may be done by various means, such as adjusting metadata to reflect the declaration, developing content of the secondary data that actually comprises pointers 206 to the source data, or another such technique. The result is a set of secondary data 202 that logically replicates the source data 204, even though the secondary data 202 does not yet physically contain any of the source data 204.

As updates are made to the source data 250 (FIG. 2B), it becomes a mix of original 252 and modified 254 source data. To avoid losing the data replaced by updates, images of each "old" data block must be physically written from the source 250 to a secondary location 256 on an appropriate schedule. Thus, the secondary data 258 becomes a mix of logical data 257 (still unchanged in the source 250) and old blocks 256 physically written from the source 250. Updates can be handled in different ways. In one case, the host continually physically writes "old" data from primary 250 to secondary storage 256, for example in a suitable "background" process. Alternatively, under an "on-demand" technique, the host waits until an update to an item of original ("old") data is received, and before writing the update to primary 250 the host physically writes the old data item to secondary storage 256. In this way, the secondary copy 258 is still preserved after the point in time at which it was taken. A "copy-on-write" relationship is said to be created between primary 250 and secondary 258 storage.

The physical data 256 is referred to as an "old block file" (OBF) for implementations where data occurs in units of "blocks." After the logical snapshot has been initiated, when updates to data blocks in the source 250 are received, their original images are copied to the OBF 256 before the updates are physically made to primary storage 250. This only needs to be done once for each distinct block that is updated on the original image. To access the logical snapshot, an entity such as a host volume manager through a device driver filter checks to see if the requested block has been updated. If it has never been updated, the block is represented by the logical secondary data 257, and therefore must be obtained from the original volume 250. Otherwise, if the requested block has been updated one or more times, the OBF 256 is the sole source for obtaining the original block image. The advantage of the logical snapshot approach, then, is that little additional disk space is needed, namely the disk space used to store original blocks, which is therefore dependent on the number of distinct blocks that get updated after the snapshot is taken. This is usually significantly less than twice the original disk space (the amount required by the physical snapshot).

Still, the logical snapshot techniques are not completely perfect. Accordingly, applications that are accessing the logical snapshot 258 need to coordinate their access to blocks in order to be assured of accessing the correct original block images, either in the OBF 256 or the original disk image 252. Conflict can arise between applications accessing the blocks 252 as primary data 250 and those applications accessing the blocks 252 as part of the secondary data 258. If a block is in the process of being copied to the OBF as a result of a source block update, then any applications accessing the secondary copy must wait for the block to be written to the secondary copy before accessing it there. This necessitates some locking or arbitration scheme. For example, a backup application that is copying data from the logical snapshot 258 will have to lock the file(s) 252 being copied so that their blocks are not updated while being copied to the backup media (not shown). This imposes overhead on the application even if the copy operations are being performed outboard from the application server.

In an attempt to address some of these concerns, some have proposed various new copy techniques, including the possible combination of the logical snapshot with outboard data movement. Unfortunately, the use of logical snapshot techniques with outboard data movement introduces complexity. One reason, referring to FIG. 1, is that the logical snapshot is virtualized through a device driver on the original host 114 and is thus not directly accessible by the outboard copy engine 104. Namely, a file system I/O driver virtualizes the snapshot, so that outboard copy engine 104 does not know which blocks to copy in obtaining the logical snapshot image. The typical solution to this involves locking objects (files) on the host 114 so that their blocks cannot be changed, mapping those blocks to their constituent volumes, and then copying the mapped blocks. Although this method successfully obtains the proper blocks from the original volume and OBF, the overhead imposed on the host 114 during the copy operation can compromise the desired goal of performing the copy operation without substantial impact to host applications. IN any event, the locking and mapping activity does impact the application.

A different approach, considered by the present inventors yet unknown in the prior art, caches updated blocks in a new block file during the time that the file system 116 is being updated and the snapshot maintained. This technique, however, has certain risks because failures could leave the file system in a corrupt state or potentially lose all application updates.

Consequently, the existing copy techniques using logical snapshot copy-on-write, outboard data copy, and combinations of these are not completely adequate for all applications due to certain unsolved problems.

SUMMARY OF THE INVENTION

A bulk-copy method creates a copy-on-write relationship between specified source data and an original image cache for all updates coming from a designated host application. This copy-on-write relationship involves, responsive to at least a first update of each item of source data, writing an original image of said updated item of data and its associated address to the original image cache. An application outboard of the designated host application is utilized to copy all source data to secondary media without regard to whether the data has been updated since creating the copy-on-write relationship. A specified amount of data is copied from the original image cache to the secondary media. As a result, the secondary media contains contents of the source data as of the moment of forming the copy-on-write relationship.

The invention affords its users with a number of distinct advantages. For example, the invention provides a consistent outboard copy of a logical snapshot image with no application impact during the time that the data is being copied, thereby realizing the true goals for performing outboard copy in the first place. A physical copy of all of the data does not have to be made to form the duplicate, minimizing the amount of additional disk space that is required for the consistent snapshot. The invention also provides a number of other advantages and benefits, which should be apparent from the following description of the invention.

BRIEF DESCRIPTION OF THE DRAWINGS

FIG. 3 is a block diagram of the hardware components and interconnections of a data storage subsystem according to one embodiment of the invention.

DETAILED DESCRIPTION

Figure 1:
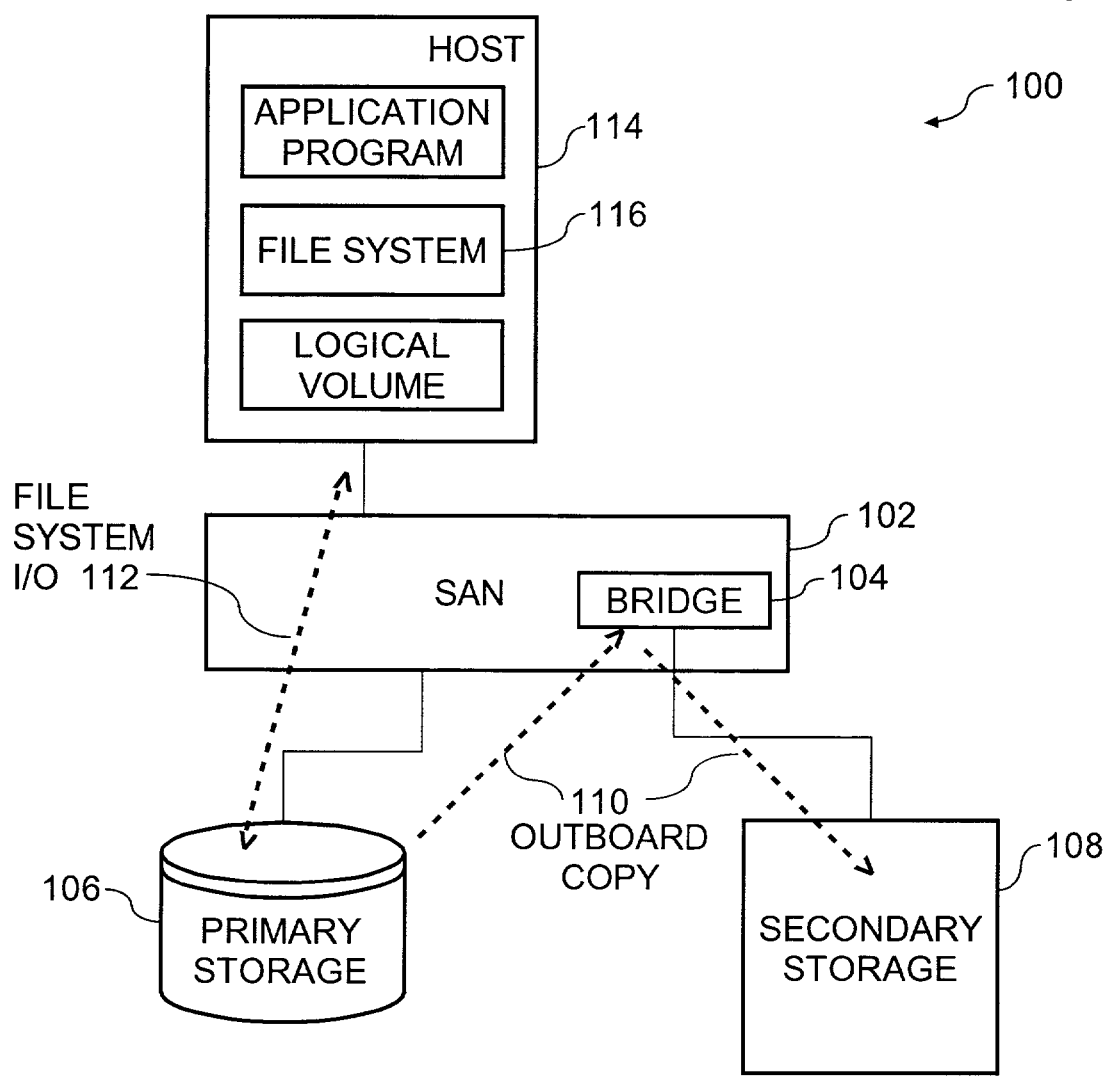
FIG. 1 is a block diagram of the hardware components and interconnections of a conventional data storage subsystem with facilities for performing outboard copies.
Figure 2A:
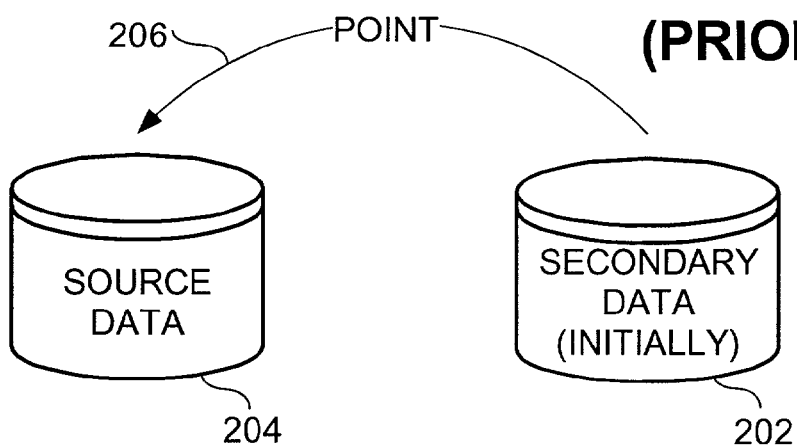
FIGS. 2A–2B are block diagrams illustrating components involved in the typical copy-on-write relationship.
Figure 2B:
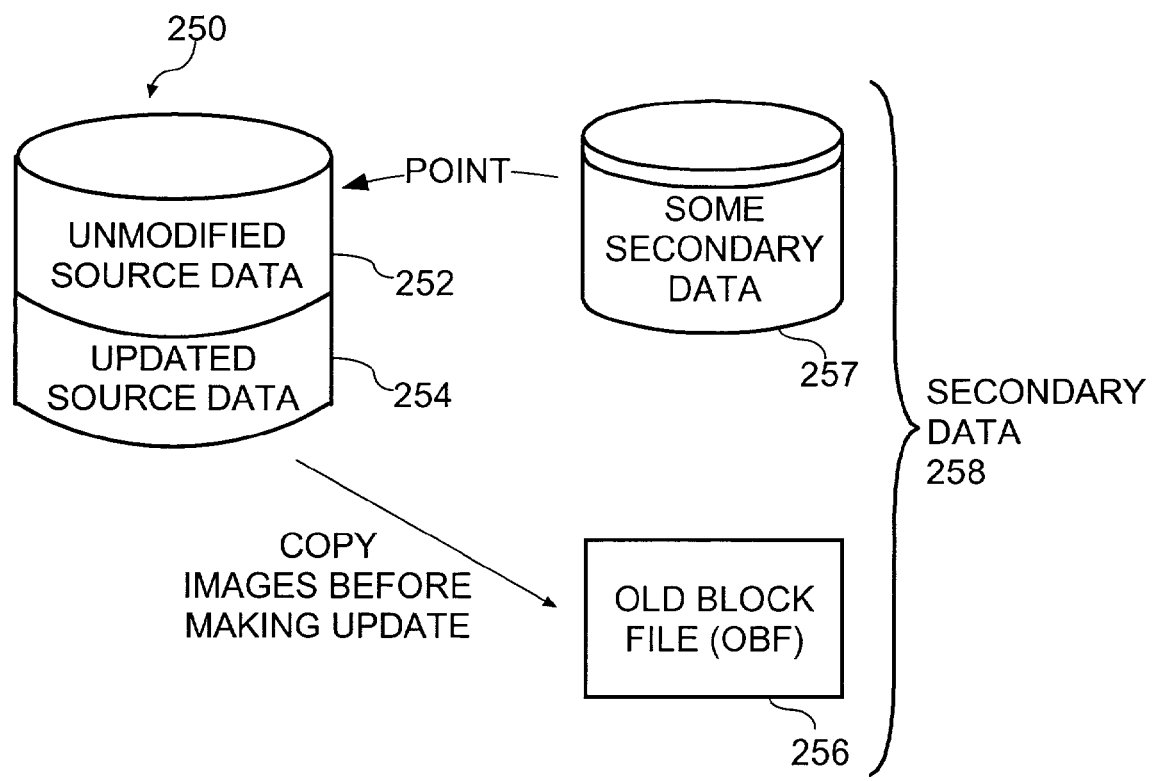

The nature, objectives, and advantages of the invention will become more apparent to those skilled in the art after considering the following detailed description in connection with the accompanying drawings.

Hardware Complnents & Interconnections

Overall Structure

One aspect of the invention concerns a digital data storage system, which may be embodied by various hardware components and interconnections, with one example being described by the system 300 of FIG. 3. The system 300 includes a digital data processing machine 302, exemplified by the server 302. The server 302 receives read/write requests from one or more hosts 360, and executes the requests using storage subcomponents such as the primary storage 310. The hosts 360 may comprise computing machines, application programs, or any appropriate hardware and/or software construct. The server 302 includes portions 302a–302b devoted to primary and snapshot copies of data. The portions 302a–302b may comprise different applications, subroutines, processes, processing threads, processing machines, circuits, logic, or any other processing facilities. In the illustrated examples, the primary and snapshot copy portions 302a–302b comprise different application programs. Each portion 302a–302b includes a file system 304a, 304b and logical volume 306a, 306b. Each file system comprises an organizational mapping of directories, files, and their attributes to a logical or physical volume that operates to place and later locate directory and file attributes and data blocks on the logical/physical volume. Each logical volume comprises a mapping function that operates to virtualize a single logical volume over one or more physical volumes or partitions by mapping the block addresses to physical addresses in the underlying volumes during I/O operations.

The system 300 also includes a copy agent 301, which in the illustrated embodiment comprises an application program running on the server 302. Alternatively, the copy agent 301 may comprise a host machine, host application program, hardware device or subpart thereof, computer, user input devices or another source of instructions directed at the server 302, SAN 308, and the like. Operation of the agent 301 is discussed in greater detail below.

The system 300 also includes primary storage 310, secondary storage 316, an OBF 312 (also referred to as an "original image cache"), an optionally backup media 340. These components may be implemented by different physical storage devices or media, logical devices or media, partitions, volumes, data objects, or any other physical or logical construct. One example of the backup media 340 comprises a number of magnetic tape cartridges, such as a tape cartridge library.

In the illustrated embodiment, the server 302 is coupled to primary storage 310 and secondary storage 316 by a SAN 308. The primary storage 310 contains source data 310*a*. The secondary storage 316 contains a physical copy 316*a* of the source data 310*a*, which is created by the operations discussed below. The physical copy 316*a* may also be referred to as a secondary copy. The secondary storage 316 is coupled to the SAN 308 by a bridge 314, which comprises an application, machine, processing thread, subroutine, program, or other processing entity separate (outboard) from the server 302 and its components 302*a*, 302*b*. The bridge 314 is therefore outboard in that it does not access data through the data paths utilized or supported by the server 302. Depending upon the requirements of the application at hand, the bridge 314 may be part of the SAN 308 or a separate component.

A data path 311*a* provides a path from the server 302 to the primary storage 310 including the source data 310*a*. A data path 311*b* couples the server 302 to the OBF 312, which is used when a copy-on-write relationship occurs. As mentioned below, the snapshot copy 302*b* comprises access to the source data 310*a* (via data path 313) and the OBF 312 (via data path 315).

Exemplary Digital Data Processing Apparatus

As mentioned above, data processing entities such as the server 302 and/or the bridge 314 may be implemented in various forms. One example is a digital data processing apparatus, as exemplified by the hardware components and interconnections of the digital data processing apparatus 400 of FIG. 4.

The apparatus 400 includes a processor 402, such as a microprocessor, personal computer, workstation, or other processing machine, coupled to a storage 404. In the present example, the storage 404 includes a fast-access storage 406, as well as nonvolatile storage 408. The fast-access storage 406 may comprise random access memory ("RAM"), and may be used to store the programming instructions executed by the processor 402. The nonvolatile storage 408 may comprise, for example, battery backup RAM, EEPROM, flash ROM, one or more magnetic data storage disks such as a "hard drive", a tape drive, or any other suitable storage device. The apparatus 400 also includes an input/output 410, such as a line, bus, cable, electromagnetic link, communications interface, or other means for the processor 402 to exchange data with other hardware external to the apparatus 400.

Despite the specific foregoing description, ordinarily skilled artisans (having the benefit of this disclosure) will recognize that the apparatus discussed above may be implemented in a machine of different construction, without departing from the scope of the invention. As a specific example, one of the components 406, 408 may be eliminated; furthermore, the storage 404, 406, and/or 408 may be provided on-board the processor 402, or even provided externally to the apparatus 400.

Logic Circuitry

In contrast to the digital data processing apparatus discussed above, a different embodiment of the invention uses logic circuitry instead of computer-executed instructions to implement processing entities such as the server 302 and/or bridge 314. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), programmable logic device ("PLD"), and the like.

Operation

Having described the structural features of the present invention, the operational aspect of the present invention will now be described. As mentioned above, the operational aspect of the invention generally involves a copy method supplementing an outboard data copy with a previously instituted copy-on-write logical snapshot to effectively create a duplicate consistent with the source data as of a specific time.

Signal-Bearing Media

Figure 4:
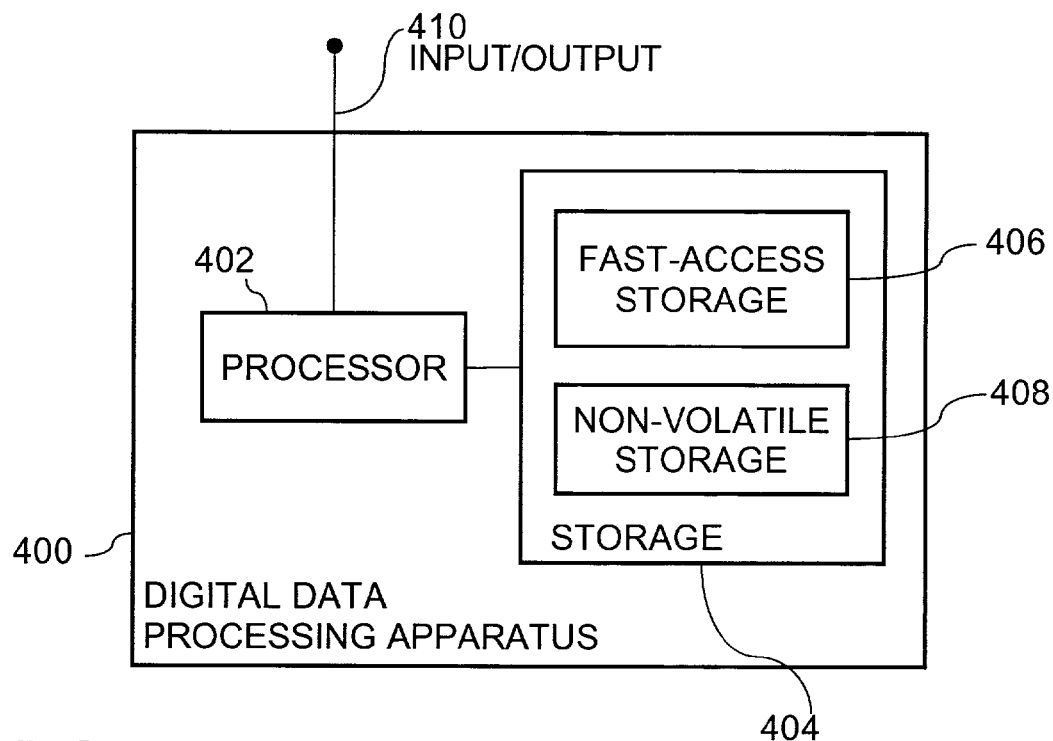
FIG. 4 is a block diagram of a digital data processing machine according to one embodiment of the invention.
Figure 5:
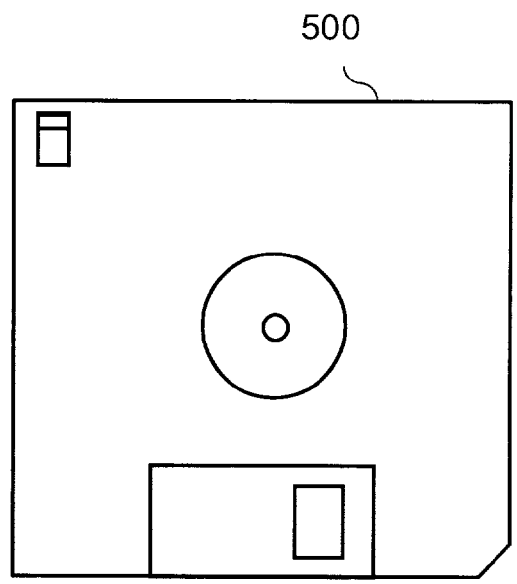
FIG. 5 shows an exemplary signal-bearing medium according to one embodiment of the invention.

Wherever the functionality of the invention is implemented using one or more machine-executed program sequences, these sequences may be embodied in various forms of signal-bearing media. In the context of FIG. 4, such a signal-bearing media may comprise, for example, the storage 404 or another signal-bearing media, such as a magnetic data storage diskette 500 (FIG. 5), directly or indirectly accessible by a processor 402. Whether contained in the storage 406, diskette 500, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, or EEPROM), battery backup RAM, optical storage (e.g., CD-ROM, WORM, DVD), or other suitable signal-bearing media including analog or digital transmission media and analog and communication links and wireless communications. In an illustrative embodiment of the invention, the machine-readable instructions may comprise software object code, assembled from assembly language, compiled from a language such as C, etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Copy Sequence

Figure 6:
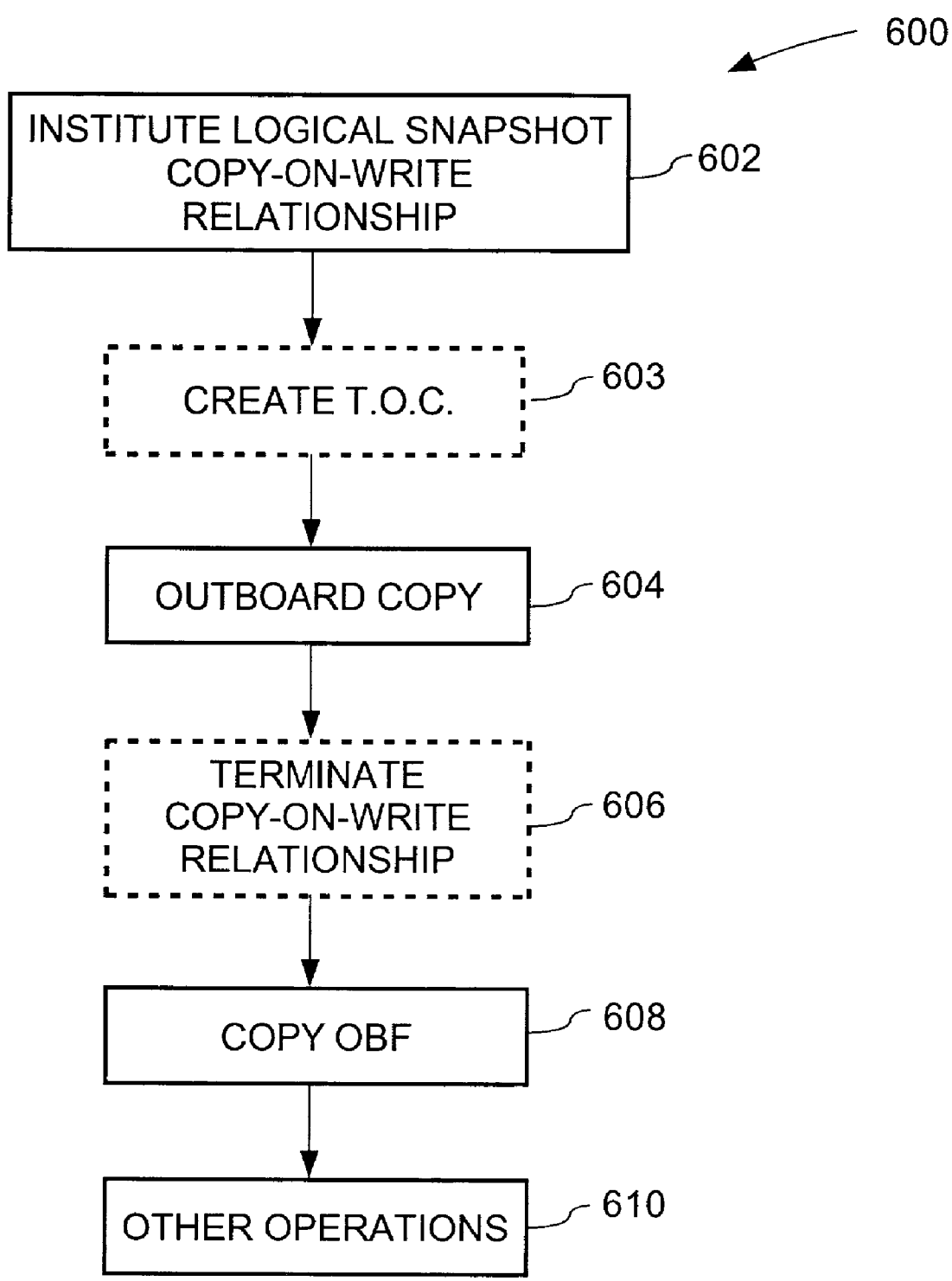
FIG. 6 is a flowchart of a copy sequence according to one embodiment of the invention.

FIG. 6 shows a copy sequence 600 that operates by supplementing an outboard data copy with a previously instituted copy-on-write logical snapshot to effectively create a duplicate consistent with the source data as of a specific time. For ease of explanation, but without any intended limitation, the example of FIG. 6 is described in the context of the system 300 described above in FIG. 3.

The sequence 600 is initiated in step 602, in which the logical snapshot copy 302*b* is created, instituting a copy-on-write relationship between the source data 310*a* and the OBF 312. This involves creation of the data path 311*b*, so that whenever a data block of the source data 310*a* is updated, the old data block is written to the OBF 312. Along with a block or other item of data is written the data item's address, relative position, or other locator. Although "blocks" are discussed to provide a representative example, other units of data are also contemplated, including but not limited to files, records, logical devices or subportions, pages, extents, address ranges, etc. To illustrate step 602 more specifically, the agent 301 issues appropriate instructions to quiesce the application 302a that manages the source data 310a, and thereafter institute the copy-on-write relationship. The application 302a is quiesced in a consistent state, such as by suspending or deferring write operations. With the source data 310a quiesced in a consistent state, the copy-on-write relationship is started and maintained by the file system 304a, disk device driver through file system filter driver, device driver filter driver software, or other entity that ensures that the original contents and address of source data blocks have been recorded in the OBF 312 before they are updated in the source data 310a.

Also in step 602, the agent 301 instructs the server 302 to initiate the logical snapshot copy 302b. The logical snapshot copy 302b comprises a logical copy of the source data 310a, established by configuring metadata pointers to a combination of source data 310a and OBF data 312 such that the original copy of the source data 310a is pointed-to. Creation of the snapshot copy establishes the data paths 313, 315. With the copy-on-write relationship and snapshot copy established, the agent 301 releases the application 302a to resume making updates to the source data 310a.

In step 603 (which is optional), the agent 301 (or server 302) creates a table of contents from the logical snapshot 302b while it is still established, so that the relationship between file or directory objects and block numbers can be recorded. This relationship can be used at a later time to locate and restore (or copy back) individual files that reside in the file system instead of the file system in its entirety. The table of contents maps each file, object, record, page, or other data item of the snapshot copy 302b to the addresses of its constituent blocks therein. Creation of the table of contents requires that the snapshot be visible to the copy agent 301.

In step 604, the agent 301 invokes the bridge 314 to physically copy the source data 310a to the physical copy 316a. Along with each item of source data, step 604 copies the data item's address, relative position, or other locator. This is an outboard data copy since it is performed by a processing entity separate from the application server 302. The bridge 314 copies each block of source data without regard for any update activity from the application 302a (and hosts 360) that has occurred after the logical snapshot was taken. As an example, step 604 may be performed using the SCSI-3 XCOPY command.

In step 606, after the bridge 314 has finished copying the source data 310a to the physical copy 316a, the agent 301 terminates the logical snapshot 302b, and ends the copy-on-write relationship between the source data 310a and OBF 312. Thus, the data path 311b is severed and the OBF 312 is no longer updated. By terminating the logical snapshot 302b, the data paths 313, 315 are also severed. Unlike conventional snapshot programs, which automatically terminate an OBF at the conclusion of a logical snapshot, the operation 606 retains the OBF 312. For instance, destruction of the OBF 312 may be prevented by the agent 301 providing specific instructions to the server 302 to retain the OBF 312. As another example, destruction of the OBF may be prevented by ensuring that the file system blocks associated with the space allocated to the original OBF are not overwritten by new files until the original OBF information is copied. This does not necessarily require prevention of OBF erasure, but that OBF contents be preserved by not overwriting the blocks that were once used by the OBF. The operation 606 prevents any changes to the OBF 312 until its contents can be copied by step 608, as discussed below. At this point, the retained OBF 312 contains the original image of all blocks of source data 310a that had been updated between the creation of the logical snapshot in step 602 and termination of the snapshot in step 606.

In step 608, the bridge 314 copies the OBF 312 into secondary storage 316. According to one embodiment, each data block of the OBF 312 is copied so as to overwrite any existing counterpart of that data block in the physical copy 316a. In this case, step 608 results in an exact physical copy of the source data 310a as of the moment that the logical snapshot was instituted, as shown by 372. In another embodiment, step 608 is performed so as to append OBF data blocks 372 to the outboard data copy 370a existing in the storage 316, as shown by 370.

As an alternative to the foregoing description, step 606 omitted, with the copy-on-write relationship being terminated some time after step 608. For instance, the copy-on-write relationship may be terminated during copying of the OBF in step 608. In this case, however, step 608 does not copy all of the OBF 312. Rather, step 608 is limited to copying data present in the OBF 312 as of completion of the outboard copy 604. In this embodiment, the amount of data in the OBF 312 may be marked at the completion of step 604 by entering a marker, noting the identity of the last entry, recording the file size, etc.

In any event, various other operations 610 can be performed after step 608, as desired. For example, the OBF 312 may be erased. As another example, where the OBF 312 has been appended to the outboard data copy in step 608, the agent 301 may automatically integrate the OBF and outboard data copy during subsequent reclamation, reorganization, or other data management operations. In this way, blocks in the OBF are used to replace the salient blocks in the outboard data copy. With this embodiment, the OBF portion of the physical copy 316a may then be discarded and the integrated block data image alone used for any subsequent restore operations. As another example, in step 610 the copy agent 301, bridge 314, or another component may form a backup by copying the physical copy 316a into the backup media 340, thereby forming a backup copy 340a. In the case where the physical copy 316a is made up of components 370a–370b, the backup copy 340a may comprise a replica of the data 370a–370b appended together, or the components 370a–370b may be integrated as part of the backup operation if desired.

While the invention leverages the use of logical snapshot copy-on-write technology to perform a bulk copy operation, the existence of the logical snapshot 302 does not need to be surfaced to the application host 360. In other words, the application 302b and access paths 313, 315 do not need to be visible to the host 360 and/or applications in the server 302 that manage the primary copy 302a. One exception, however, is in the case where the table of contents is created in step 603, in which case the snapshot copy 302b is made visible to the table of contents creator, namely the agent 301 or server 302.

RESTORE SEQUENCE—FIRST EMBODIMENT

Figure 7A:
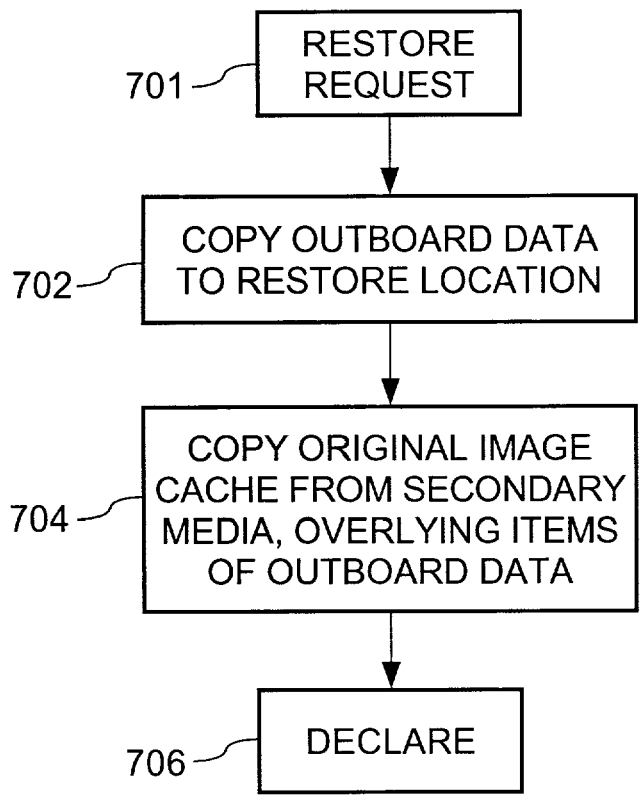
FIGS. 7A–7B are flowcharts of RESTORE sequences according to various embodiments of the invention.

FIG. 7A shows a restore sequence 700, which broadly serves to utilize the physical copy 316a to restore the source data 310a, for example in case of destruction, contamination, failure, or other loss of the source data 310a. As an alternative, using similar principles, the sequence 700 may utilize the backup copy 340a to restore the source data 310a. For ease of explanation, but without any intended limitation, the example of FIG. 7A is described in the context of the system 300 described above in FIG. 3. Furthermore, the sequence 700 is described in the context of the particular embodiment of sequence 600 where step 608 appends OBF blocks 370b to the outboard data copy 370a.

The sequence 700 starts in step 701, in which the agent 301 receives a restore request. This request may be received from a hierarchically superior application or host, from an operator such as a system administrator, from a process internal to the server 302, or another source. In the illustrated example, the restore request comes from the host 360. Response to the restore request, the agent 301 copies the outboard data portion 370a of the physical copy 316a to a designated restore site, for example in the source data 310a (step 702). Then, the agent 301 copies each data block of the OBF portion 370b of the physical copy 316a to the restore site; each data block from 370b overwrites any existing counterpart data block of the outboard data copy 370a (step 704). After step 704 completes, the application 302a adjusts metadata pointers as needed to point to the source data's new location in storage 310 (unless the source data has been restored precisely to the original address of the source data 310a), and then declares that the restore has been successful (step 706). Thus, the restore site now constitutes the source data 310a. After step 706, the source data 310a is now restored to its previous state, as of the moment that the logical snapshot was taken back in step 602.

As an alternative to the foregoing description, restoration may also be performed for specifically named data blocks rather than the entire body of source data 310a. In this case, responsive to the restore request of step 701, the agent 301 accesses a table of contents stored with the physical copy 316a to find and then copy the requested data blocks from the outboard data portion 370a of the physical copy 316a to the designated restore site (step 702). Then, the agent 301 copies each requested data block of the OBF portion 370b of the secondary data 316 to the restore site, each data block 370b overwriting any existing counterpart data block 370a of the outboard data copy (step 704). OBF blocks are only copied if they correspond to the blocks that belong to the particular files being restored, according to the table of contents. After step 704, the application 302a adjusts metadata pointers as needed to point to the restored blocks' new locations in storage 310 (unless the primary blocks were restored precisely to their original addresses in the source data 310a), and then declares that the restore has been successful (step 706). This declaration shows the restored data blocks to be source data, in replacement of the data blocks for which restoration was requested.

RESTORE SEQUENCE—SECOND EMBODIMENT

Figure 7B:
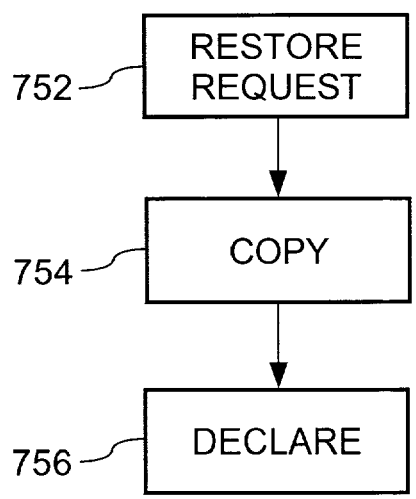

FIG. 7B shows a different restore sequence 750, namely, a sequence based upon the embodiment of operation 608 that overwrites OBF blocks upon their counterpart data blocks in the outboard data copy (as shown by 372, FIG. 3). In other words, the restoration sequence 750 starts with a physical copy 316a comprising a mirror image of the source data 310a as of the moment the logical snapshot was created (namely, step 602). Namely, the physical copy comprises the integrated data 372. The sequence 750 is also appropriate where, as discussed above, subsequent reclamation, reorganization, or other operations been performed in such a way to integrate the OBF 370a and outboard data copy 370b portions of the physical copy 370. Alternatively, the sequence 750 may utilize the backup copy 340a rather than the integrated physical copy 372.

The sequence 750 is initiated in step 752, in which the agent 301 receives a restore request, similar to step 701 discussed above. If this restore request constitutes a request to restore the entire body of source data 310a, the application 302a copies the physical copy 316a back into primary storage 316 (step 754). In step 756, after adjusting metadata as needed to treat the copy in primary storage 310 as the source data, the application 302a declares that this copy constitutes the source data 310a. In this case, original contents of the source data are now restored to their previous state, as of the moment that the logical snapshot was taken back in step 602.

If the restore request constituted a request to restore certain files of the source data 310a, then the application 302a in step 754 accesses a table of contents (mapping each file in the physical copy 316a to its constituent data blocks) to find the desired data blocks, and limits copying to those pertinent data blocks. In this case, step 756 makes declaration only for these data blocks, that they now constitute the source data blocks in replacement the counterparts in 310a.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A bulk copy method, comprising operations of:
   creating a copy-on-write relationship between specified source data and an original image cache for updates from at least one designated host application, where responsive to at least a first update of each item of source data, an original image of said updated item of source data and its associated location are written to the original image cache;
   after completing the creating operation, utilizing an application outboard of the designated host application to copy all items of source data and their associated locations to a secondary data object without regard to whether the items of source data have been updated since creating the copy-on-write relationship;
   copying a specified amount of contents of the original image cache to the secondary data object, the specified amount of comprises contents of the original image cache as of completion of the utilizing operation;
   permitting the copy-on-write relationship to continue during the utilizing operation and during at least part of the copying operation.

2. The method of claim 1,
   where the specified amount comprises substantially all contents of the original image cache.

3. The method of claim 1, the operations further comprising:
 between the utilizing and copying operations, terminating the copy-on-write relationship.

4. The method of claim 1, where the copying operation comprises one of the following:
 for each item of data being copied, copying the item of data from the original image cache to a location in the secondary data object corresponding to its associated location so as to overwrite any updated item of data of the same associated location and having been written by the utilizing operation;
 appending the specified amount to contents of the secondary data object produced by the utilizing operation.

5. The method of claim 1, the operations further comprising RESTORE operations, comprising:
 copying all items of data copied by the utilizing operation from the secondary data object to their respective associated locations in a restore site, then copying all data copied by the copying operation from the secondary data object to the respective associated locations in the restore site overwriting any existing data in said associated locations.

6. The method of claim 1, where:
 the copying operation comprises, if an item of data being copied corresponds to a location of an item of data already existing on the secondary data object, overwriting the existing item of data in the secondary data object;
 the operations further comprising RESTORE operations comprising copying data items of the secondary data object to their associated locations in a restore site.

7. A signal-bearing medium tangibly embodying a program of machine-readable instructions executable by a digital processing apparatus to perform bulk copy operations comprising:
 creating a copy-on-write relationship between specified source data and an original image cache for updates from at least one designated host application, where responsive to at least a first update of each item of source data, an original image of said updated item of source data and its associated location are written to the original image cache;
 after completing the creating operation, utilizing an application outboard of the designated host application to copy all items of source data and their associated locations to a secondary data object without regard to whether the items of source data have been updated since creating the copy-on-write relationship;
 copying a specified amount of contents of the original image cache to the secondary data object, the specified amount comprises contents of the original image cache as of completion of the utilizing operation;
 permitting the copy-on-write relationship to continue during the utilizing operation and during at least part of the copying operation.

8. The medium of claim 7,
 where the specified amount comprises substantially all contents of the original image cache.

9. The medium of claim 8, the operations further comprising:
 between the utilizing and copying operations, terminating the copy-on-write relationship.

10. The medium of claim 8, where the copying operation comprises one of the following:
 for each item of data being copied, copying the item of data from the original image cache to a location in the secondary data object corresponding to its associated location so as to overwrite any updated item of data of the same associated location and having been written by the utilizing operation;
 appending the specified amount to contents of the secondary data object produced by the utilizing operation.

11. The medium of claim 8, the operations further comprising RESTORE operations, comprising:
 copying all items of data copied by the utilizing operation from the secondary data object to their respective associated locations in a restore site, then copying all data copied by the copying operation from the secondary data object to the respective associated locations in the restore site overwriting any existing data in said associated locations.

12. The medium of claim 8, where:
 the copying operation comprises, if an item of data being copied corresponds to a location of an item of data already existing on the secondary data object, overwriting the existing item of data in the secondary data object;
 the operations further comprising RESTORE operations comprising copying data items of the secondary data object to their associated locations in a restore site.

13. A logic circuit of multiple interconnected electrically conductive elements configured to perform bulk copy operations comprising:
 creating a copy-on-write relationship between specified source data and an original image cache for updates from at least one designated host application, where responsive to at least a first update of each item of source data, an original image of said updated item of source data and its associated location are written to the original image cache;
 after completing the creating operation, utilizing an application outboard of the designated host application to copy all items of source data and their associated locations to a secondary data object without regard to whether the items of source data have been updated since creating the copy-on-write relationship;
 copying a specified amount of contents of the original image cache to the secondary data object, the specified amount comprises contents of the original image cache as of completion of the utilizing operation;
 permitting the copy-on-write relationship to continue during the utilizing operation and during at least part of the copying operation.

14. A data storage system, comprising:
 a primary storage;
 a secondary storage;
 a computing machine;
 an interface coupling the server to the primary and secondary storage;
 wherein the computing machine is programmed to perform bulk copy operations including:
  creating a copy-on-write relationship between specified source data in the primary storage and an original image cache for updates from at least one designated host application, where responsive to at least a first update of each item of source data, an original image of said updated item of source data and its associated location are written to the original image cache;
  after completing the creating operation, utilizing an application outboard of the designated host application to copy all items of source data and their associated locations to a secondary data object without regard to whether the items of source data have been updated since creating the copy-on-write relationship;

copying a specified amount of the original image cache to the secondary data object, the specified amount comprises contents of the original image cache as of completion of the utilizing operation;

permitting the copy-on-write relationship to continue during the utilizing operation and during at least part of the copying operation.

15. A data storage system, comprising:

primary means for storing data;

secondary means for storing data;

original image cache means for storing data;

an interface coupled to the first and second means;

computing means, coupled to the interface, for performing bulk copy operations by:

creating a copy-on-write relationship between specified source data in the primary means and the original image cache means for updates from at least one designated host application, where responsive to at least a first update of each item of source data, an original image of said updated item of source data and its associated location are written to the original image cache means;

after completing the creating operation, utilizing an application outboard of the designated host application to copy all items of source data and their associated locations to a secondary data object in the second means without regard to whether the items of source data have been updated since creating the copy-on-write relationship;

copying a specified amount of the original image cache means to the secondary data object, the specified amount comprises contents of the original image cache as of completion of the utilizing operation;

permitting the copy-on-write relationship to continue during the utilizing operation and during at least part of the copying operation.

* * * * *